United States Patent [19]

Trinh et al.

[11] Patent Number: 5,104,916
[45] Date of Patent: Apr. 14, 1992

[54] METHOD OF PREPARING A VULCANIZING COMPOUND AND UTILIZATION THEREOF IN BINDERS FOR ROAD-MAKING

[75] Inventors: Cu C. Trinh, Caluire; Denis Million, Venissieux, both of France

[73] Assignee: Societe Anonyme d'Application des Derives de l'Asphalte-S.A.A.D.A., Roussillon, France

[21] Appl. No.: 706,556

[22] Filed: May 28, 1991

Related U.S. Application Data

[62] Division of Ser. No. 352,276, May 16, 1989.

[51] Int. Cl.⁵ .............................. C08L 95/00
[52] U.S. Cl. .......................... 524/71; 525/349
[58] Field of Search .................. 524/68, 70, 71

[56] References Cited

FOREIGN PATENT DOCUMENTS 0040729 12/1981 European Pat. Off. .
1470874 9/1961 Fed. Rep. of Germany .
1912202 3/1969 Fed. Rep. of Germany .

OTHER PUBLICATIONS

Journal of Applied Polymer Science, vol. 23, pp. 185–200 (1979).

*Primary Examiner*—Christopher Henderson
*Attorney, Agent, or Firm*—Toren, McGeady & Associates

[57] ABSTRACT

A vulcanization composition for elastomers, the compostion comprising, by weight: 0.5 parts to 3 parts mercaptobenzothiazole, 0.5 parts to 3 parts tetramethylthiuram disulfide, 3 parts to 5 parts zinc oxide, 1 part to 3 parts stearic acid, 1 part to 4 parts anti-oxidant, and 1 part to 5 parts vulcanization agent constituted by 0% to 100% sublimated sulfur, 0% to 75% sulfur donor selected from thiurams and dithiomorpholines, and 0% to 50% sulfenamide, with the weight ratio of sulfenamide to sulfur donor lying in the range $\frac{1}{3}$ to 1. The invention is applicable to vulcanizing a three-sequence copolymer of styrene-butadiene-styrene mixed with bitumen.

12 Claims, No Drawings

METHOD OF PREPARING A VULCANIZING COMPOUND AND UTILIZATION THEREOF IN BINDERS FOR ROAD-MAKING

This is a division of application Ser. No. 07/352,276 filed May 16, 1989.

The invention relates to vulcanizing elastomers, in particular for preparing bitumen-based binders for road-making.

BACKGROUND OF THE INVENTION

A known technique for improving the mechanical and thermal properties of the bitumen used as a binder for road-making is to incorporate elastomers therein.

In this application, as in many others, it is common practice to use vulcanized elastomers, i.e. elastomers in which the macromolecular chains are connected to one another by sulfur atoms in order to form a three-dimensional lattice. When applied to binders for road-making, vulcanization stabilizes the dispersion of the elastomer in the bitumen and makes it possible to reduce the fraction of elastomer which is required for obtaining the desired improvement in properties.

Whatever the application, an elastomer is vulcanized by making it react with a vulcanization agent. The most conventional vulcanization agent is sulfur itself, however various sulfur compounds, in particular organic compounds of sulfur, has been proposed as vulcanization agents. Vulcanization additives such as accelerators, retarders, and anti-oxidants are commonly used in conjunction with a vulcanization agent.

It has been observed that sulfur is poorly wetted in a molten mass of bitumen and elastomer, thereby giving rise to poor dispersion and to a violent reaction which gives off a large amount of heat, thereby degrading the elastomer. Further, it is practically impossible to predict the degree of vulcanization which will be achieved using a given quantity of sulfur, and as a result the mixture may turn out to be insufficiently vulcanized, or on the contrary it may constitute an unusable gelled mass. Finally, it can happen that after coming to an initial halt, the vulcanization reaction starts up again much later when the temperature is raised, e.g. after the binder has been spread on a road, and this can give rise to undesirable changes in the properties of the binder.

The above drawbacks also exist, although sometimes to a lesser extent, with other prior art vulcanization agents and in other applications of vulcanized elastomers.

An essential object of the present invention is to enable the vulcanization agents to be thoroughly dispersed throughout the mass to be vulcanized and to cause the vulcanization reaction to take place evenly until it reaches a predetermined final degree of vulcanization.

In has also been observed that sulfur and other prior art vulcanization agents form polysulfide bridges between the elastomer chains, i.e. bridges constituted by a plurality of sulfur atoms in series, and these bridges are relatively fragile and consequently they run the risk of breaking during the vulcanization reaction, or later on. Another object of the invention is to propose a vulcanization agent which gives rise to stronger bridges than those obtained using elemental sulfur.

SUMMARY OF THE INVENTION

The present invention provides a vulcanization composition for elastomers, the composition comprising, by weight: 0.5 parts to 3 parts mercaptobenzothiazole, 0.5 parts to 3 parts tetramethylthiuram disulfide, 3 parts to 5 parts zinc oxide, 1 part to 3 parts stearic acid, 1 part to 4 parts anti-oxidant, and 1 part to 5 parts vulcanization agent constituted by 0% to 100% sublimated sulfur, 0% to 75% sulfur donor selected from thiurams and dithiomorpholines, and 0% to 50% sulfenamide, with the weight ratio of sulfenamide to sulfur donor lying in the range ⅓ to 1.

In the composition of the invention, the vulcanization agent is either sulfur, or a donor of sulfur associated with a sulfenamide, or else all three of these ingredients simultaneously. The thiurams usable as a sulfur donor are compounds that contain at least one thiuram radical. One such compound is tetramethylthiuram disulfide. When this compound is used as a sulfur donor, its concentration for this purpose should be added to the 0.5 to 3 parts of this compound already present in the composition.

In all cases, prior mixing of the vulcanization agent and the other ingredients of the composition in the proportions mentioned imparts wetting properties thereto, enabling it to be thoroughly dispersed, in particular throughout a mass of bitumen. In addition, this association of ingredients ensures that the vulcanization agent reacts evenly and completely.

Further, the sulfur donor associated with the sulfenamide gives rise to mon-sulfide bridges being formed which are stronger than the polysulfide bridges due to the action of sublimed sulfur. The resulting lattice therefore increases in stability when its composition has less sulfur and more sulfur donor and sulfenamide.

The anti-oxidant used in the composition may be constituted, in particular, by an acetodiphenylamine condensate, e.g. as sold under the name Permanax BLW.

The preferred formulation for the composition comprises, by weight, about 1 part tetramethylthiuram sulfide, 3 parts vulcanization agent, 5 parts zinc oxide, 3 parts stearic acid, and 1 part anti-oxidant.

When the vulcanization agent comprises a sulfur donor and a sulfenamide, it is advantageous for these items to be dithio-4-4'-morpholine and 2-benzothiazylsulfenemorpholide, respectively. In the above preferred formulation, these two compounds preferably represent about 2 parts and 1 part by weight respectively, with sulfur being practically absent.

The invention also provides a method of preparing a composition as defined above, in which the ingredients are dry mixed while in the powder state and the mixture is allowed to cool under dry conditions.

The invention also provides a method of preparing a binder for road-making, of the type in which a bitumen and an elastomer are mixed together, after which vulcanization reagents for the elastomer (vulcanization agents and vulcanization additives) are added to the mixture. According to the invention, the vulcanization reagents are added in the form of the composition as defined above.

The elastomer is preferably a three-sequence linear copolymer selected from styrene-butadiene-styrene copolymers and sytrene-isoprene-styrene copolymers, and may have a molecular mass lying between about 100,000 and 300,000.

In the method, about 20% by weight of the vulcanization compound may be used relative to the elastomer, with the elastomer representing between about 0.5% and about 10% by weight of the bitumen. However, the proportion of the vulcanization composition is not at all critical. If it is reduced, then the degree of cross-linking is reduced. If it is increased, then unreacted vulcanization agent will remain in the finished product.

Particularly satisfactory results have been obtained when operating as follows:

the bitumen is raised to a temperature lying between about 150° C. to 180° C.;

the elastomer, in the form of a fine powder, is inserted progressively into the bulk of the bitumen which is maintained at said temperature and stirred vigorously;

stirring and temperature are maintained until the mixture becomes homogeneous;

the vulcanization composition is inserted in the same way as the elastomer; and stirring and temperature are maintained until the mixture becomes homogeneous.

In order to prepare the composition of the invention, a horizontal axis powder grinder is used, e.g. of the type sold under the name Nautamix. During mixing, the mixture heats up and it is necessary to allow it to cool down under dry conditions so as to prevent aggregates or lumps forming in the composition, so far as is possible. After cooling, the composition may be bagged for later use.

The method of the invention for preparing a binder for road-making may use any road type bitumen regardless of whether it is obtained by direct distillation or is lightly oxidized. However, aromatic bitumens are preferred for which penetration lies in the range 15 tenths of a millimeter to 220 tenths of a millimeter.

As mentioned above, the preferred elastomer is a three-sequence linear copolymer of the styrene-butadiene-sytrene or styrene-isoprene-styrene type, having a molecular mass lying in the range 100,000 to 300,000. These copolymers melt at a relatively low temperature which stimulates good retention of their properties and of the properties of the other ingredients used.

In addition to the bitumen, the elastomer, and the vulcanization composition, it may be advantageous to add into the binder 0.2% to 5% relative to the bitumen of an aliphatic or aromatic plastifying oil of very low volatility, together with an ester of hydrogenated colophony, thereby stimulating swelling of the elastomer and improving the sticking power of the binder. As plastifying oil, it is advantageous to use a polyisobutene melting at a temperature lying in the range 40° C. to 60° C. and having a molecular mass lying in the range 300 to 1,500. Advantageously, while adding the elastomer to the bitumen, a mixture is added to the bitumen at the same place as the elastomer is being added, said mixture comprising about 80% polyisobutene and about 20% colophony ester, said mixture constituting 0.3% to 3% by weight of the bitumen.

The method of the invention gives rise to binders presenting excellent adhesion with aggregates when they are used dry, however this adhesion is affected by the presence of dampness. In order to avoid this phenomenon, it is advantageous to add an adhesion agent, in particular a fatty polyamide selected from alcoylimidazopolyamides and oleylpolypropylenepolyamines, at a concentration of 0.1% to 0.5% by weight of bitumen, and preferably at about 0.3%. This addition should be performed as late as possible when preparing the binder since it requires considerable mixing energy at temperatures lying between 130° C. and 150° C.

By way of example, an operation of preparing a binder using the method of the invention may take place as follows:

The bitumen is heated to 180° C. while being stirred in a heating mixer. Once this temperature has been reached, the bitumen is stirred vigorously, and the elastomer in fine powder form and the mixture of polyisobutene and colophony ester are added thereto simultaneously in such a manner as to cause the grains of elastomer to be coated by said mixture at the moment that they penetrate into the bitumen. It is appropriate to use means such as a burying plowshare-like tool to cause these ingredients to penetrate into the body of the bitumen. The ingredients are added very progressively, in this example, over a period of 1 hour 30 minutes.

Stirring is continued and the temperature is maintained until the mixture is perfectly homogeneous, which may be verified by ultraviolet microscopy. This homogenizing lasts for 15 minutes. The vulcanization composition is then added, after breaking up any lumps that may have formed therein since it was prepared. This addition lasts for 15 minutes and it is followed by a period of 15 minutes during which stirring and temperature are maintained in order to obtain complete dispersion, which is likewise verified by ultraviolet microscopy. Naturally, the above durations vary as a function of the materials used. The adhesion agent of the fatty polyamine type is added to the moving mixture immediately prior to dispatch. A typical formula for a binder obtained in accordance with the present invention is given below in parts by weight:

bitumen: 100
polystyrene-butadiene-polystyrene copolymer: 0.5 to 10
polyisobutene (Napvis D10): 0.24 to 2.4
hydrogenated colophony ester: 0.06 to 0.6
vulcanization composition: 0.1 to 2
fatty polyamine: 0.1 to 0.5

This binder can be stored, pumped, and used like conventional bitumen at temperatures lying in the range 170° C. to 180° C. according to the use thereof.

Depending on the grades of bitumen used, the proportions of elastomer and plasticizer, the resulting binders can be used for making high modulus hot coatings, more flexible thin layer hot coatings, or very high performance coating binders if appropriate flux and liquefier additives are used.

We claim:

1. A method of preparing a binder for road-making in which a bitumen and an elastomer are mixed together at a temperature between about 150° C. and about 180° C., and the mixture is caused to vulcanize by means of a vulcanizing composition comprising, by weight, 0.5 parts to 3 parts mercaptobenzothiazole, 0.5 parts to 3 parts tetramethylthiuram disulfide, 3 parts to 5 parts zinc oxide, 1 part to 3 parts stearic acid, 1 part to 4 parts anti-oxidant, and 1 part to 5 parts vulcanizing agent, said vulcanizing agent comprising at least a sulfur donor selected from the group consisting of thiurams and dithiomorpholines and a sulfenamide, with the weight ratio of sulfenamide to sulfur donor lying in the range of ⅓ to 1, and, optionally, sublimated sulfur, the sulfur donor representing not more than 75% and the sulfenamide representing not more than 50% of the vulcanizing agent.

2. A method according to claim 1, wherein the elastomer is a three-sequence linear copolymer selected from the group consisting of styrene-butadiene-styrene copolymers and styrene-isoprene-styrene copolymers.

3. A method according to claim 2, wherein the copolymer has a molecular mass lying in the range of about 100,000 to about 300,000.

4. A method according to claim 1, wherein the weight ratio of the elastomer to the bitumen lies between about 0.5% and about 10%.

5. A method according to claim 1, wherein the weight ratio of the vulcanizing composition to the elastomer is about 20%.

6. A method according to claim 1, wherein said vulcanizing composition comprises, by weight, about 1 part tetramethylthiuram disulfide, 3 parts vulcanizing agent, 5 parts zinc oxide, 3 parts stearic acid, and 1 part anti-oxidant.

7. A method according to claim 1, wherein the anti-oxidant is a condensate of acetodiphenylamine.

8. A method according to claim 1, wherein the sulfur donor is dithio-4-4'-morpholine and the sulfenamide is 2-benzo-thiazylsulfenemorpholine.

9. A method according to claim 8, wherein the sulfur donor comprises about 2 parts dithiomorpholine and one part sulfenamide, and being substantially free from sulphur.

10. A method according to claim 1, comprising the step of preparing said vulcanizing composition such that the ingredients are mixed dry while in the powder state and the mixture is allowed to cool under dry conditions.

11. A method according to claim 1, comprising the following steps:
   the bitumen is heated to a temperature lying between about 150° C. and about 180° C.;
   the elastomer is added progressively in fine powder form into the body of the bitumen which is maintained at said temperature and which is stirred vigorously;
   stirring and temperature are maintained until the mixture is homogeneous;
   the vulcanizing composition is added under the same conditions as the elastomer; and
   stirring and temperature are maintained until the mixture is homogeneous.

12. A method according to claim 1, wherein an adhesion agent selected from the group consisting of alcoylimidazopolyamines and oleylpolypropylene-polyamines is incorporated in the mixture at a concentration of 0.1% to 0.5% by weight relative to the bitumen.

* * * * *